United States Patent
Espeseth et al.

(10) Patent No.: US 10,235,069 B2
(45) Date of Patent: Mar. 19, 2019

(54) LOAD BALANCING BY DYNAMICALLY TRANSFERRING MEMORY RANGE ASSIGNMENTS

(71) Applicant: Western Digital Technologies, Inc., Irvine, CA (US)

(72) Inventors: Adam Michael Espeseth, Rochester, MN (US); Brent William Jacobs, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 25 days.

(21) Appl. No.: 15/388,768

(22) Filed: Dec. 22, 2016

(65) Prior Publication Data

US 2018/0181328 A1    Jun. 28, 2018

(51) Int. Cl.
G06F 3/06 (2006.01)
G06F 12/02 (2006.01)
G06F 12/1009 (2016.01)

(52) U.S. Cl.
CPC .......... *G06F 3/0622* (2013.01); *G06F 3/0659* (2013.01); *G06F 3/0679* (2013.01); *G06F 3/0688* (2013.01); *G06F 12/0246* (2013.01); *G06F 12/1009* (2013.01); *G06F 2212/2022* (2013.01); *G06F 2212/7201* (2013.01); *G06F 2212/7205* (2013.01)

(58) Field of Classification Search
CPC .... G06F 3/0679; G06F 3/0622; G06F 3/0659; G06F 3/0688; G06F 12/0246; G06F 12/1009; G06F 2212/2022; G06F 2212/7201; G06F 2212/7205
See application file for complete search history.

(56) References Cited

U.S. PATENT DOCUMENTS

| | | | | |
|---|---|---|---|---|
| 5,305,448 A | * | 4/1994 | Insalaco | G06F 9/52 711/164 |
| 5,690,406 A | * | 11/1997 | Furukawa | H04N 1/38 353/25 |
| 7,203,801 B1 | * | 4/2007 | Sharma | G06F 3/0611 711/148 |
| 8,954,657 B1 | | 2/2015 | Asnaashari et al. | |

(Continued)

OTHER PUBLICATIONS

Agrawal, et al.; Design Tradeoffs for SSD Performance; dated Oct. 4, 2016; 14 total pages.

*Primary Examiner* — Michael Krofcheck
(74) *Attorney, Agent, or Firm* — Patterson & Sheridan, LLP; Steven Versteeg

(57) ABSTRACT

A method and apparatus for accessing a storage device is disclosed. More specifically, for load balancing by dynamically transferring memory address range assignments. In one embodiment, a storage device receives, from a host apparatus, an access request directed at two or more storage addresses, assigns, based on a first storage address of the two or more storage addresses, the access request to a first processor of two or more processors of the storage device, obtains a local memory lock based on the first storage address, determines, based on a second storage address of the two or more storage addresses, that the second storage address is assigned to a second processor of the two or more processors, obtains a remote memory lock from the second processor based on the second storage address and processes the access request.

26 Claims, 12 Drawing Sheets

(56) References Cited

U.S. PATENT DOCUMENTS

| | | | |
|---|---|---|---|
| 9,009,397 B1 | 4/2015 | Asnaashari et al. | |
| 9,170,938 B1 | 10/2015 | Walsh et al. | |
| 9,195,588 B2 | 11/2015 | Cepulis | |
| 9,223,698 B2 | 12/2015 | Tal | |
| 9,239,783 B2 | 1/2016 | Prins et al. | |
| 9,378,067 B1 | 6/2016 | Agarwala et al. | |
| 9,436,404 B2 | 9/2016 | Beeson et al. | |
| 2003/0212731 A1* | 11/2003 | Brenner | G06F 9/5088 718/105 |
| 2012/0137075 A1* | 5/2012 | Vorbach | G06F 9/526 711/122 |
| 2015/0095554 A1* | 4/2015 | Asnaashari | G06F 12/0246 711/103 |
| 2015/0169475 A1* | 6/2015 | Brown | G06F 12/1466 711/163 |
| 2016/0231948 A1 | 8/2016 | Gupta et al. | |

* cited by examiner

LOAD BALANCING BY DYNAMICALLY TRANSFERRING MEMORY RANGE ASSIGNMENTS

BACKGROUND OF THE DISCLOSURE

Field of the Disclosure

Embodiments of the present disclosure generally relate to data storage. More specifically, aspects of the present disclosure relate to drive load balancing by dynamically transferring range assignments.

Description of the Related Art

Many applications require long-term data storage and typically a high-degree of data integrity. Typically these needs are met by non-volatile data storage devices. Non-volatile storage stores data without requiring a persistent power supply. Non-volatile storage or persistent media can be provided by a variety of devices, most commonly, by hard disk drives (HDDs) and solid state drives (SSDs).

HDDs record magnetic patterns of data on a spinning, writable disk surface, while SSDs store data using non-volatile solid state electronic circuits without using movable mechanical parts. To read or write information to either HDDs or SSDs, a software application or operating system may specify a location for the data. Generally, information is stored in sets of bits of a particular length known as blocks, which are read or written a whole block at a time. Generally, storage of information a block at a time is abstracted by a file system component of the operating system for use by applications and the file system specifies, to the storage device, which blocks to read or write.

One commonly used scheme for specifying blocks of data is logical block addressing (LBA), which uses a linear address space where addressable storage spaces appears as a single contiguous address space. In LBA, each linear base address identifies a single block and these base addresses may be passed into lower level systems, such as a drive controller, which may implement an indirection system handling LBA to physical mappings of the storage mechanism.

As the complexity and number of applications have increased, the demands on storage systems have also increased and evolved. What are needed are techniques for distributing this workload across the resources available in order to better manage the workload in a scalable and flexible manner.

Therefore, a method of load balancing by dynamically transferring range assignment is needed.

SUMMARY OF THE DISCLOSURE

The present disclosure generally relates to the method for load balancing by dynamically transferring range assignments across processors. More specifically, workload on a storage device, such as a SSD, may be load balanced across multiple processors by dividing an entire storage range into smaller ranges and assigning these smaller ranges across the processors. Commands addressed to a particular range may then be directed to a specific processor associated with the particular range. In some embodiments, ranges may be loaned between processors and in some embodiments, ranges may be reassigned to different processors to help balance load across the processors.

Certain aspects of the present disclosure provide a method for load balancing by dynamically transferring range assignments. The method generally includes receiving, from a host apparatus, an access request directed at two or more storage addresses, assigning, based on a first storage address of the two or more storage addresses, the access request to a first processor of two or more processors of the storage device, obtaining a local memory lock based on the first storage address, determining, based on a second storage address of the two or more storage addresses, that the second storage address is assigned to a second processor of the two or more processors, obtaining a remote memory lock from the second processor based on the second storage address, and processing the access request.

In some embodiments, ranges' processor assignments may be adjusted. In these embodiments, the method further comprises determining to change from a first algorithm for assigning storage addresses to the two or more processors to a second algorithm, issuing a transition barrier command to each processor of the two or more processors, receiving, from each processor of the two or more processors, a response to the transition barrier command, and issuing a transition barrier complete message to each processor after receiving the response from all of the processors.

The details of one or more examples are set forth in the accompanying drawings and the description below. Other features, objects, and advantages will be apparent from the description and drawings, and from the claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Certain aspects of the present discourse provide a method for load balancing by dynamically transferring range assignments. The method generally includes receiving, from a host apparatus, an access request directed at two or more storage addresses, assigning, based on a first storage address of the two or more storage addresses, the access request to a first processor of two or more processors of the storage device, obtaining a local memory lock based on the first storage address, determining, based on a second storage address of the two or more storage addresses, that the second storage address is assigned to a second processor of the two or more processors, obtaining a remote memory lock from the second processor based on the second storage address, and processing the access request.

Figure 1:
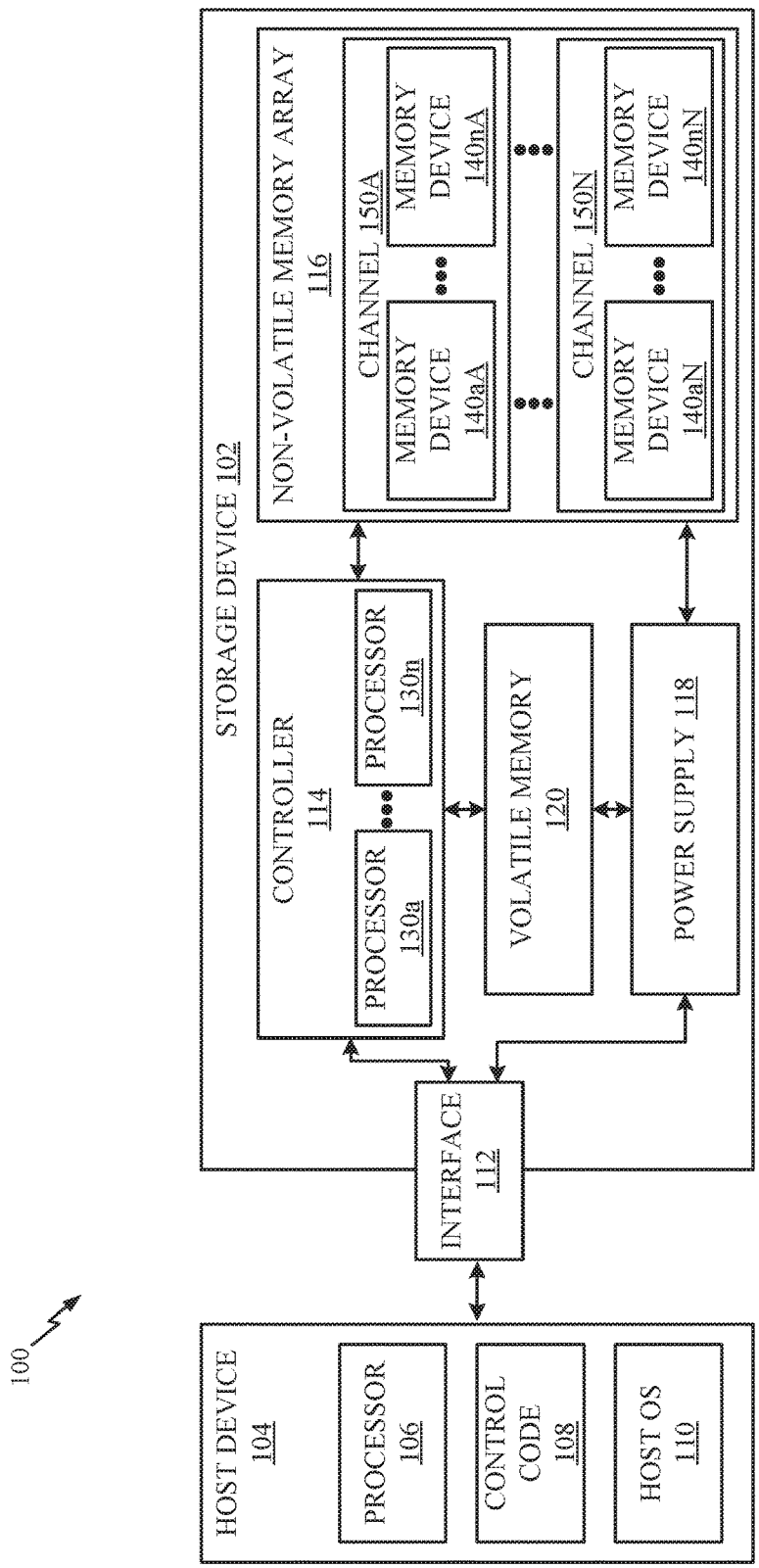
FIG. 1 is a block diagram illustrating an example storage environment in which a storage device may function as a storage device for a host device, in accordance with aspects of the present disclosure.

FIG. 1 is a conceptual and schematic block diagram illustrating an example computing environment 100 having a storage device 102 for host device 104, in accordance with one or more techniques of this disclosure. For instance, host device 104 may utilize non-volatile memory devices included in storage device 102 to store and retrieve data. In some examples, computing environment 100 may include a plurality of storage devices, such as storage device 102, that may operate as a storage array. For instance, computing environment 100 may include a plurality of storages devices 102 configured as a redundant array of inexpensive/independent disks (RAID) that collectively function as a mass storage device for host device 104.

Computing environment 100 may include host device 104 which may store and/or retrieve data to and/or from one or more storage devices, such as storage device 102. As illustrated in FIG. 1, host device 104 may include one or more processors 106 executing control code 108 in the context of a host OS 110. The host OS 110 may generate a request, such as a read or write request, for one or more LBA addresses, or range. This request is passed via the control code 108 to the processor 106, which may issue the request to the storage device 102. In some examples, the control code 108 may be a hardware driver. The host device 104 may communicate with storage device 102 via interface 112. Host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Host device 104 may identify data stored in storage device 102 using logical or virtual addresses, such as a LBA range.

As illustrated in FIG. 1 storage device 104 may include controller 114, non-volatile memory array 116 (NVMA 116), power supply 118, volatile memory 120, and interface 112. In some examples, storage device 102 may include additional components not shown in FIG. 1 for sake of clarity. For example, storage device 102 may include a printed board (PB) to which components of storage device 102 are mechanically attached and which includes electrically conductive traces that electrically interconnect components of storage device 102 and the like. In some examples, the physical dimensions and connector configurations of storage device 102 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, storage device 102 may be directly coupled (e.g., directly soldered) to a motherboard of host device 104.

Storage device 102 may include interface 112 for interfacing with host device 104. Interface 112 may include one or more data buses for exchanging data with host device 104 and one or more control buses for exchanging commands with host device 104. Interface 112 may operate in accordance with any suitable protocol. For example, interface 112 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), and PCI-express. The electrical connection of interface 112 (e.g., the data buses, the control buses, or both) is electrically connected to controller 114, providing electrical connection between host device 104 and controller 114, allowing data to be exchanged between host device 104 and controller 114. In some examples, the electrical connection of interface 112 may also permit storage device 102 to receive power from host device 104. For example, as illustrated in FIG. 1, power supply 118 may receive power from host device 104 via interface 112.

Storage device 102 may include power supply 118, which may provide power to one or more components of storage device 102. When operating in a standard mode, power supply 118 may provide power to the one or more components using power provided by an external device, such as host device 104. For instance, power supply 118 may provide power to the one or more components using power received from host device 104 via interface 112. In some examples, power supply 118 may include one or more power storage components configured to provide power to the one or more components when operating in a shutdown mode, such as where power ceases to be received from the external device. In this way, power supply 118 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 102 includes one or more controller 114, which may contain one or more processors 130a-130n. In some cases, the processors 130 may be cores of a multi-core processor. Controller 114 may manage one or more operations of storage device 102. For instance, controller 114 may manage the reading of data from and/or the writing of data to one or more memory devices 140. Generally as used herein, although processor refers to processors of the controller of the storage device, although in some cases, the techniques described herein may be performed by a general purpose processor, such as a host processor, for example, executing control code.

Storage device 102 may include volatile memory 120, which may be used by controller 114 to store information. In some examples, controller 114 may use volatile memory 120 as a cache. For instance, controller 114 may store cached information in volatile memory 120 until cached information is written to memory devices 140. As illustrated in FIG. 1, volatile memory 120 may consume power received from power supply 118. Examples of volatile memory 120 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)). In some examples, volatile memory 120 may be shared between multiple processors, and each processor may use a discrete portion of volatile memory 120. In other examples, each processor may use separate volatile memories.

In some examples, controller 114 may use volatile memory 120 to store a logical to physical (or virtual to physical) data address translation table. In some examples, the logical to physical data address translation table may include entries that include a logical data address and a corresponding physical data address. In some examples, rather than each entry in the logical to physical data address translation table including a logical data address, the logical to physical data address translation table may include an index that encodes the respective logical data address of each entry in the logical to physical data address translation table. In some of these examples, the logical to physical data address translation table may not store the index value (or logical data address) with the respective entries in the logical to physical data address translation table. Host device 104 may refer to a unit of data using the logical data address, and controller 114 may utilize physical data addresses to direct writing of data to and reading of data from memory devices 140.

In accordance with one or more techniques of this disclosure, controller 114 may consolidate multiple logical data addresses into a logical data address container. For one of the logical data addresses in the logical data address container, controller 114 may fully specify a physical data address corresponding to the logical data address. By fully specifying the physical data address, controller 114 may specify all location attributes such that the physical data address points to a precise location of memory devices 140 (e.g., a precise one of memory devices 140, a precise block 202, a precise page 204, etc.). For the remainder of the logical data addresses in the logical data address container, controller 114 may partially specify the respective physical data address corresponding to each logical data address. The partially specified physical data addresses may include less information than a fully specified physical data address. By partially specifying the respective physical data addresses, controller 114 may specify sufficient address information so that, in combination with the fully specified physical data address of the one logical data address, the respective physical data addresses are fully specified. However, the partially specified physical data addresses alone may not be sufficient to point to the precise location of memory devices 140.

In this way, by reducing the number of bits required for at least some of the entries in the logical to physical data address translation table, the memory consumed by the logical to physical data address translation table may be reduced. As described above, in some examples, controller 114 may cause the logical to physical data address translation table to be stored in volatile memory 120. By reducing the memory consumed by the logical to physical data address translation table, storage device 102 may include a smaller amount of volatile memory 120.

Storage device 102 may include NVMA 116, which may include a plurality of memory devices 140aA-140nN (collectively, "memory devices 140"). Each of memory devices 140 may be configured to store and/or retrieve data. For instance, a memory device 140xx of memory devices 140 may receive data and a message from controller 114 that instructs the memory device 140xx to store the data. Similarly, the memory device 140xx of memory devices 140 may receive a message from controller 114 that instructs the memory device to retrieve data. In some examples, each of memory devices 140 may be referred to as a die. In some examples, a single physical chip may include a plurality of dies (i.e., a plurality of memory devices 140). In some examples, each of memory devices 140x may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 140 may include any type of non-volatile memory devices. Some examples, of memory devices 140 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Figure 2:
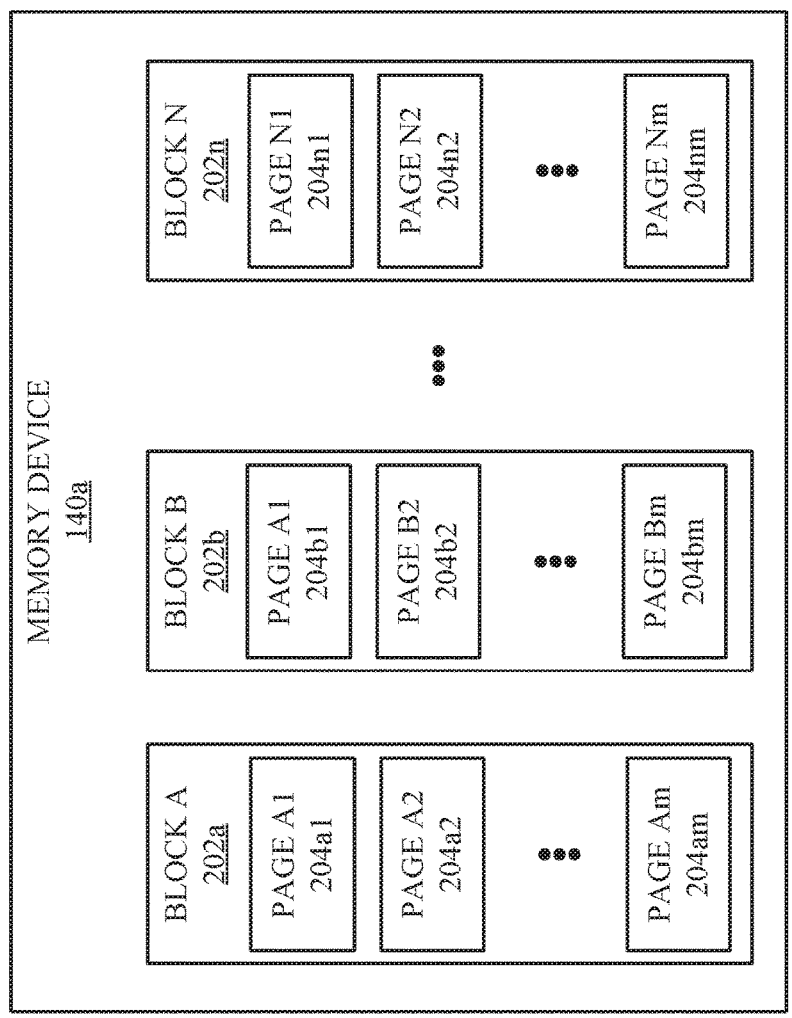
FIG. 2 is a block diagram illustrating an example memory device, in accordance with aspects of the present disclosure.

Flash memory devices may include NAND or NOR based flash memory devices, and may store data based on a charge contained in a floating gate of a transistor for each flash memory cell. In NAND flash memory devices, the flash memory device may be divided into a plurality of blocks, each of which may be divided into a plurality of pages. FIG. 2 is a conceptual block diagram illustrating an example memory device 140a, which includes a plurality of blocks 202a-202n (collectively, "blocks 202"), each of which is divided into a plurality of pages 204al-204am (collectively, "pages 204"). Each page of the pages 204 within a particular memory device (e.g., memory device 140a) may include a plurality of flash memory cells. In NAND flash memory devices, rows of flash memory cells may be electrically connected using a word line to define a page of the plurality of pages 204. Respective cells in each of the pages 204 may be electrically connected to respective bit lines. Controller 114 may write data to and read data from NAND flash memory devices at the page level and erase data from NAND flash memory devices at the block level.

In some examples, it may not be practical for controller 114 to be separately connected to each memory device 140xx of memory devices 140. As such, the connections between memory devices 140 and controller 114 may be multiplexed. As an example, memory devices 140 may be grouped into channels 150A-150N (collectively, "channels 150"). For instance, as illustrated in FIG. 1, memory devices 140aA-140nA may be grouped into first channel 140A, and memory devices 140aN-140nN may be grouped into Nth channel 150N. The memory devices 140 grouped into each of channels 150 may share one or more connections to controller 114. For instance, the memory devices 140 grouped into first channel 140A may be attached to a common I/O bus and a common control bus. Storage device 102 may include a common I/O bus and a common control bus for each respective channel of channels. In some examples, each channel 150x of channels 150 may include a set of chip enable (CE) lines which may be used to multiplex memory devices on each channel. For example, each CE line may be connected to a respective memory device 140xx of memory devices 140. In this way, the number of separate connections between controller 114 and memory devices 140 may be reduced. Additionally, as each channel has an independent set of connections to controller 114, the reduction in connections may not significantly affect the data throughput rate as controller 114 may simultaneously issue different commands to each channel.

In some examples, storage device 102 may include a number of memory devices 140 selected to provide a total capacity that is greater than the capacity accessible to host device 104. This is referred to as over-provisioning. For example, if storage device 102 is advertised to include 240 GB of user-accessible storage capacity, storage device 102 may include sufficient memory devices 140 to give a total storage capacity of 256 GB. The 16 GB of memory devices 140 may not be accessible to host device 104 or a user of host device 104. Instead, the over-provisioned portion of storage device 102 may provide additional blocks to facilitate writes, garbage collection, wear leveling, and the like. Further, the over-provisioned storage device 102 may provide additional blocks that may be used if some blocks wear sufficiently to become unusable and are retired from use. The presence of the additional blocks may allow retiring of the worn blocks without causing a change in the storage capacity available to host device 104. In some examples, the amount of over-provisioning may be defined as $p=(T-D)/D$, wherein p is the over-provisioning ratio, T is the total storage capacity of storage device 102, and D is the storage capacity of storage device 102 that is accessible to host device 104.

Figure 3:
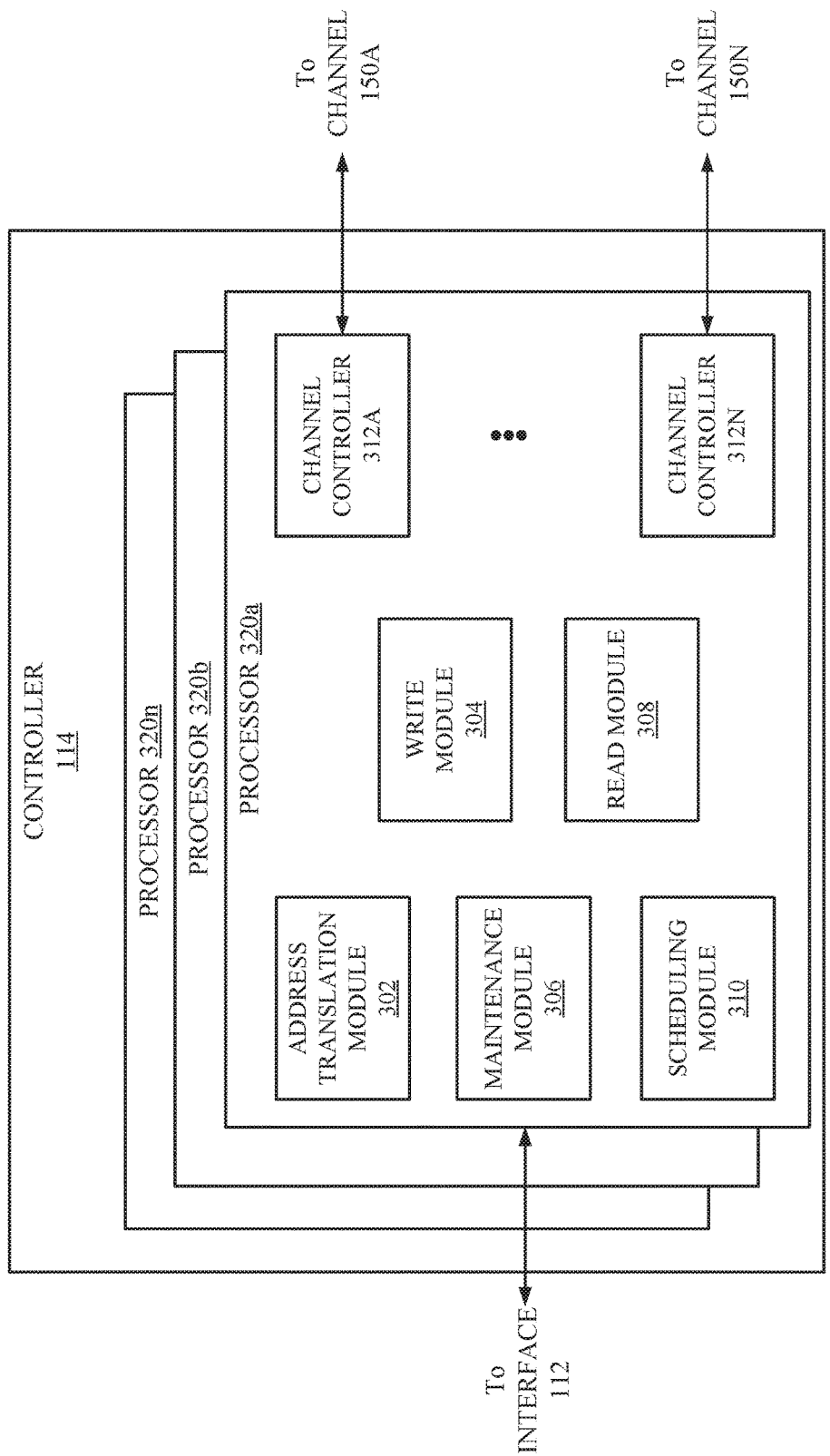
FIG. 3 is a block diagram illustrating an example controller, in accordance with aspects of the present disclosure.

FIG. 3 is a conceptual and schematic block diagram illustrating example details of controller 114. In some examples, controller 114 may include one or more processors 320a-320n (collectively, "processors 320"). Processors 320 may include, but are not limited to, microprocessors, digital signal processor (DSP), application specific integrated circuit (ASIC), field programmable gate array (FPGA), or other digital logic circuitry. In some examples, processors 320 and/or controller 114 may be a system on a chip (SoC). In some examples, processors 320 may include an address translation module 302, a write module 304, a maintenance module 306, a read module 308, a scheduling module 310, and a plurality of channel controllers 312a-312n (collectively, "channel controllers 312"). In other examples, controller 114 may include additional modules or hardware units, or may include fewer modules or hardware units. For example, channel controllers 312 may be located on a chip separate from and electrically connected to processors 320. In another example, channel controllers 312 may be separate from processors 320, but still located on a SOC with processors 320. In some examples, channel controllers 312 may be addressed by each processor of the processors 320.

Controller 114 may interface with the host device 104 via interface 112 and manage the storage of data to and the retrieval of data from memory devices 140. For example, write module 304 of controller 114 may manage writes to memory devices 140. For example, write module 304 may receive a message from host device 104 via interface 14 instructing storage device 102 to store data associated with a logical data address and the data.

Write module 304 may manage writing of the data to memory devices 140. For example, write module 304 may communicate with address translation module 302, which manages translation between logical data addresses used by host device 104 to manage storage locations of data and physical data addresses used by write module 304 to direct writing of data to memory devices 140. Address translation module 302 of controller 114 may utilize a logical to physical data address translation table that associates logical data addresses (or logical block addresses) of data stored by memory devices 140 to physical data addresses (or physical block addresses) of data stored by memory devices 140. For example, host device 104 may utilize the logical data addresses of the data stored by memory devices 140 in instructions or messages to storage device 6, while write module 304 utilizes physical data addresses of the data to control writing of data to memory devices 140. Similarly, read module 308 may utilize physical data addresses to control reading of data from memory devices 140. The physical data addresses correspond to actual, physical locations of memory devices 140. In some examples, address translation module 302 may store the logical to physical data address translation table in volatile memory 120.

In this way, host device 104 may be allowed to use a static logical data address for a certain set of data, while the physical data address at which the data is actually stored may change. Address translation module 302 may maintain the logical to physical data address translation table to map the logical data addresses to physical data addresses to allow use of the static logical data address by the host device 104 while the physical data address of the data may change, e.g., due to wear leveling, garbage collection, or the like. In some examples, the logical to physical data address translation table may be a single layer table, such that by applying a hash to a logical data address received from host device 104, address translation module 302 may directly retrieve a corresponding physical data address.

As discussed above, write module 304 of controller 114 may perform one or more operations to manage the writing of data to memory devices 140. For example, write module 304 may manage the writing of data to memory devices 140 by selecting one or more blocks within memory devices 140 to store the data and causing memory devices of memory devices 140 that include the selected blocks to actually store the data. As discussed above, write module 304 may cause address translation module 302 to update the logical to physical data address translation table based on the selected blocks. For instance, write module 304 may receive a message from host device 104 that includes a unit of data and a logical data address, select a block and page within a particular memory device of memory devices 140 to store the data, cause the particular memory device of memory devices 140 to actually store the data (e.g., via a channel controller of channel controllers 312 that corresponds to the particular memory device), and cause address translation module 302 to update the logical to physical data address translation table to indicate that the logical data address corresponds to the selected physical data address within the particular memory device of memory devices 140.

In some examples, in addition to causing the data to be stored by memory devices 140, write module 304 may cause memory devices 140 to store information which may be used to recover the unit of data should one or more of the blocks fail or become corrupted. The parity information may be used to recover the data stored by other blocks. In some examples, the parity information may be an XOR of the data stored by the other blocks.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 114 may cause an entire block to be erased. This may lead to write amplification, which refers to the ratio between the amount of data received from host device 104 to be written to memory devices 140 and the amount of data actually written to memory devices 140. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in changes to the flash memory cells. Eventually, the flash memory cells may wear out, such that data may no longer be written to the cells. Write amplification may be exacerbated by using larger blocks and/or pages.

One technique that controller 114 may implement to reduce write amplification and wear of flash memory cells includes writing data received from host device 104 to unused blocks or partially used blocks. For example, if host device 104 sends data to storage device 102 that includes only a small change from data already stored by storage device 102. The controller then may mark the old data as stale or no longer valid. Over time, this may reduce a number of erase operations blocks are exposed to, compared to erasing the block that holds the old data and writing the updated data to the same block.

Responsive to receiving a write command from host device 104, write module 304 may determine at which physical locations (e.g., blocks) of memory devices 140 to write the data. For example, write module 304 may request from address translation module 302 or maintenance module 306 one or more physical block addresses that are empty (e.g., store no data), partially empty (e.g., only some pages of the block store data), or store at least some invalid (or stale) data. Upon receiving the one or more physical block addresses, write module 304 may select one or more block as discussed above, and communicate a message that causes channel controllers 312 to write the data to the selected blocks.

Read module 308 similarly may control reading of data from memory devices 140. For example, read module 308 may receive a message from host device 104 requesting data with an associated logical data address. Address translation module 302 may convert the logical data address to a physical data address using the flash translation layer or table. Read module 308 then may control one or more of channel controllers 312 to retrieve the data from the physical data addresses. Similar to write module 304, read module 308 may select one or more blocks and communicate a message to that causes channel controllers 312 to read the data from the selected blocks.

Each channel controller of channel controllers 312 may be connected to a respective channel 150x of channels 150. In some examples, controller 114 may include the same number of channel controllers 312 as the number of channels 150 of storage device 102. Channel controllers 312 may perform the intimate control of addressing, programming, erasing, and reading of memory devices 140 connected to respective channels, e.g., under control of write module 304, read module 308, and/or maintenance module 306.

Maintenance module 306 may be configured to perform operations related to maintaining performance and extending the useful life of storage device 102 (e.g., memory devices 140). For example, maintenance module 306 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block including those cells may be retired (no longer used by controller 114 to store data). To increase the amount of data that may be written to memory devices 140 before blocks are worn and retired, maintenance module 306 may implement wear leveling.

In wear leveling, maintenance module 306 may track a number of erases of or writes to a block or a group of blocks, for each block or group of blocks. Maintenance module 306 may cause incoming data from host device 104 to be written to a block or group of blocks that has undergone relatively fewer writes or erases, to attempt to maintain the number of writes or erases for each block or group of blocks approximately equal. This may cause each block of memory devices 140 to wear out at approximately the same rate, and may increase the useful lifetime of storage device 102.

Although this may reduce write amplification and wear of flash memory cells by reducing a number of erases and writing data to different blocks, this also may lead to blocks including some valid (fresh) data and some invalid (stale) data. To combat this, maintenance module 306 may implement garbage collection. In a garbage collection operation, maintenance module 306 may analyze the contents of the blocks of memory devices 140 to determine a block that contain a high percentage of invalid (stale) data. Maintenance module 306 then may rewrite the valid data from the block to a different block, and then erase the block. This may reduce an amount of invalid (stale) data stored by memory devices 140 and increase a number of free blocks, but also may increase write amplification and wear of memory devices 140.

Scheduling module 310 of controller 114 may schedule operations to be performed by memory devices 140. For instance, scheduling module 310 may cause one or more of memory devices 140 to perform one or more operations based on requests received from other components of controller 114. In some examples, scheduling module 310 may cause a particular memory device of memory devices 140 to perform one or more operations by causing a channel controller corresponding to the particular memory device to output commands to the particular memory device. As one example, scheduling module 310 may permit channel controller 312a to output commands that cause memory device 140 to store data.

Example Load Balancing by Dynamically Transferring Memory Range Assignments

Aspects of the present disclosure provide techniques for load balancing by dynamically transferring range assignments. Generally, users are running more and more increasingly complex applications that each may trigger numerous read and write operations to storage devices. This workload generally consumes an amount of processor resources. As workloads increase, the amount of processor resources consumed also increases and it may be desirable to spread this load across multiple processors to distribute the workload and avoid overloading a single processor.

In distributing the workload, commands may be assigned to any processor having available capacity, regardless of the LBA to which the command is directed. By allowing commands to be distributed to any available processor, workloads may be dynamically balanced across multiple processors. However, as each processor may be able to address the same LBA, global locking across multiple processors is required as different processors may attempt to execute different commands addressed to the same LBA out of order. For example, a write command to a specific LBA may be assigned to processor 1 and a read command to the same specific LBA may be assigned to processor 2, where the read command is intended to be executed after the write command. However, absent a global locking mechanism, processor 2 may execute, out of order, the read command prior to write command, resulting in unexpected data being returned by the read command. It should be noted that while the present disclosure refers to LBA and LBA ranges, aspects of the present disclosure may apply to other techniques for addressing one or more blocks of a storage device.

The workload may also be distributed across processors by assigning a fixed or static range of LBAs to each processor such that each processor handles commands addressed to a LBA within the range of LBAs assigned to each processor. While a fixed range is efficient and may address command ordering issues, certain workload patterns may be handled sub-optimally. For example, a workload which focuses on a small range of LBAs may not be efficiently distributed across the processors.

According to aspects of the present disclosure, to help distribute the workload, storage access commands, such as read or write requests, may be distributed across the multiple processors based on the address range requested. For example, a LBA range may be divided such that processor 0 may be assigned a range with an address ending in 0x0XX and 0x8XX, processor 1 may be assigned a range with an address ending in 0x1XX and 0x9XX, and so on until all LBA ranges have been assigned. Each LBA range may be determined by any known technique. For example, the range may be a single contiguous range of LBAs, multiple contiguous LBA ranges, individual LBAs determined based on a hash or range division algorithm for determining multiple contiguous LBA ranges. Where multiple contiguous LBA ranges for a given processor are used, commands spanning multiple LBAs may be contained fully within a single processor's subset, while still allowing for LBA access patterns which have some spatial locality to be distributed across multiple processors. After LBA ranges have been determined, a host device may issue a read command starting at LBA 0x94E and this read command would then be directed to processor 1.

Figure 4:
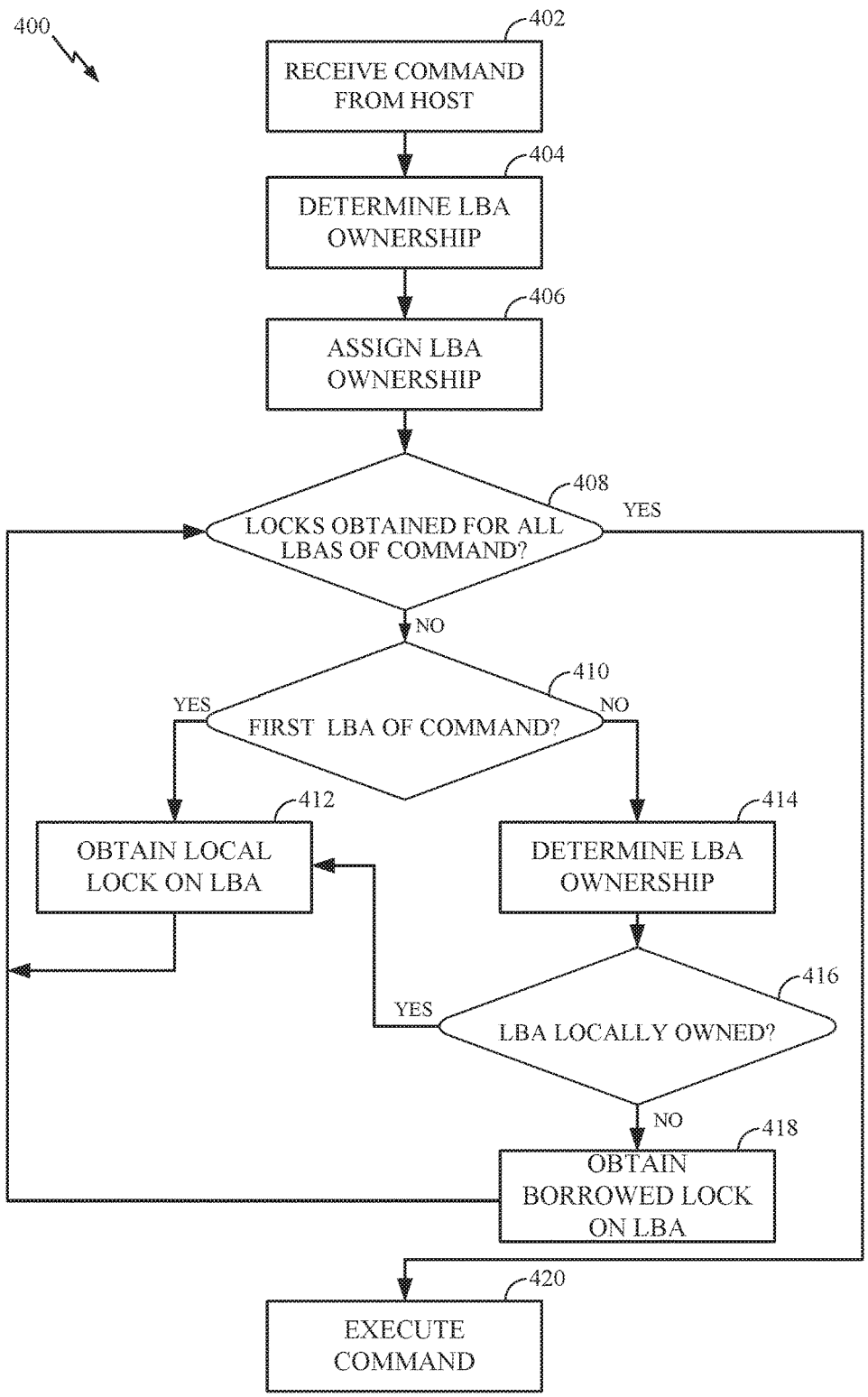
FIG. 4 is a schematic flowchart illustrating a technique for obtaining locks, according to aspects of the present disclosure.

According to aspects of the present disclosure, local locks may be obtained for storage ranges of a command assigned to the processor handling the command, and borrowed locks may be obtained for storage ranges of a command assigned to other processors. FIG. 4 is a schematic flowchart 400 illustrating a technique for obtaining locks, according to aspects of the present disclosure. At operation 402, a command for access, such as a read, write, or delete command, is received by the storage device from the host. The command includes an associated LBA or LBA range for one or more blocks to be accessed. At operation 404, the first LBA may be compared to the ranges assigned to the processors to determine which particular processor the LBA is to be assigned to. This determination may be performed, for example, by a command distributor, which may be a processor of the multiple processors. At operation 406, the LBA is assigned to a specific processor and at operation 408, the specific processor checks whether locks have been obtained for all LBAs associated with the command. This may be performed, for example, by looping through all LBAs associated with the command and checking if the last LBA of the command has been processed. Where locks have not been obtained for all LBAs associated with the command, at operation 410 if the LBA being processed is the first LBA associated with the command, a local lock on the LBA is obtained at operation 412 and execution returns to operation 408 to process the next LBA. Where an entire LBA range associated with the command is assigned to the particular processor, then local locks are taken as required ensuring execution order and atomicity for execution of the command against the associated LBA range. At operation 414, if the LBA being processed is not the first LBA associated with the command, the LBA being processed may be compared to the ranges assigned to the processors to determine which particular processor the LBA being processed is assigned to, in a manner similar to that described in operation 404. At operation 416, if the LBA being processed is assigned to the current processor then a local lock on the LBA is obtained at operation 412. If the LBA being processed is assigned to another processor, then at operation 418, the current processor may make a request to borrow the LBA from the other processor. A LBA may be borrowed by the current processor by placing a request to the other processor assigned LBA to place a local lock on the LBA. This request may be acknowledged after the lock is successfully placed by the other processor and execution returns to operation 408 to process the next LBA. Once all LBAs are processed and locks obtained, the command may be executed at operation 420.

According to aspects of the present disclosure, the storage device may monitor the workloads of the processors and if the workload is determined to be unbalanced across the processors, the address range division among the processors may be adjusted. For example, if a majority of LBA accesses are being performed by a minority of the processors, the LBA ranges assigned to each processor may be adjusted.

Figure 5:
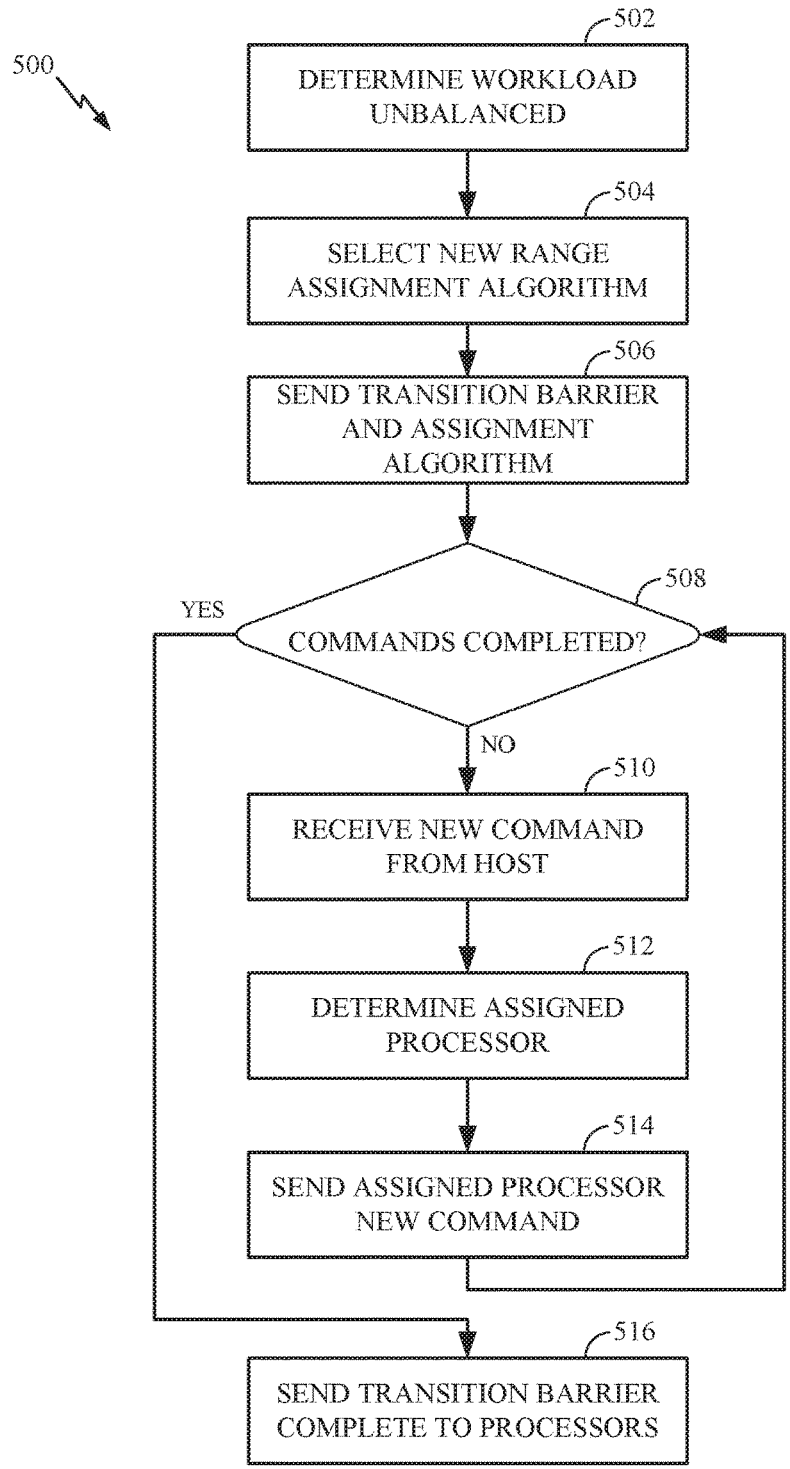
FIG. 5 is a schematic flowchart illustrating a technique for adjusting processor range assignments, in accordance with aspects of the present disclosure.

FIG. 5 is a schematic flowchart 500 illustrating a technique for adjusting processor range assignments, in accordance with aspects of the present disclosure. At operation 502, determining the workload across the multiple processors is unbalanced. This determination may be performed, for example, by a monitoring process executing on one or more processors. This monitoring process may be part of the scheduling module or a separate module. At operation 504, a new range division algorithm may be selected for determining which address ranges are assigned to which individual processors. This new algorithm may be a different algorithm than the algorithm currently in use. This algorithm may be selected from any algorithm for optimizing load balancing under various conditions.

At operation 506, a transition barrier command is sent to each processor of the multiple processors. This transition barrier command indicates that a range division algorithm switch is in progress and may include the new range division algorithm to be used. The transition barrier command may be transmitted, for example, by a distribution entity, which may be a part of the scheduling module, executing on one or more of the processors. After receiving the transition barrier command, each processor may reply with a completion indication after each processor has finished executing all commands in flight before the transition barrier command was received. At operation 508, if replies have been received from each processor indicating that all commands have been executed and no new commands have been received since the transition barrier command was issued, a transition barrier complete command may be sent to each processor indicating that the new range division algorithm has been implemented at operation 516. At operation 510, a new command may be received from the host after the transition barrier command is sent, but before the transition barrier complete command is sent. At operation 512, a determination is made as to which particular processor the command is to be assigned in a manner similar to that described in operation 404 based on ranges determined using the new range division algorithm. At operation 514, the command is sent to the particular processor based on the determination and execution returns to 508.

FIGS. 6A-6D are schematic flowcharts 600 illustrating a technique for obtaining locks while adjusting processor range assignments, in accordance with aspects of the present disclosure. At operation 602, a command for access, such as a read, write, or delete command, is received by a storage device from the host. At operation 604, determining whether processor range assignments are being adjusted. If processor range assignments are not being adjusted, for example where a transition barrier has not been sent, execution proceeds to operation 408 of FIG. 4. If processor range assignments are being adjusted, for example where a transition barrier has been sent, at operation 606, a determination is made whether locks, either local or remote, have been obtained for all LBAs associated with the command. If locks have been obtained for all LBAs associated with the command, the command may be executed at operation 616.

If locks have not been obtained for all LBAs, execution proceeds to operation 608 and a determination of which processor a LBA of the command is to be assigned based on the current (i.e., previously used) range division algorithm to is made in a manner similar to that described in operation 404. At operation 610, a determination of which processor the LBA of the command is to be assigned to based on the new (i.e., as specified in the transmission barrier command) range division algorithm is made in a manner similar to that described in operation 404. While the range assignments are being adjusted, each processor will determine, under both the new and current range division algorithms, which processor should be assigned the LBA. If, at operation 612, the LBA associated with the command is determined to be assigned to the current processor under both algorithms, a local lock on the LBA is obtained at operation 614 in a manner similar to that described in operation 412. Execution then loops back to operation 606.

Figure 6A:
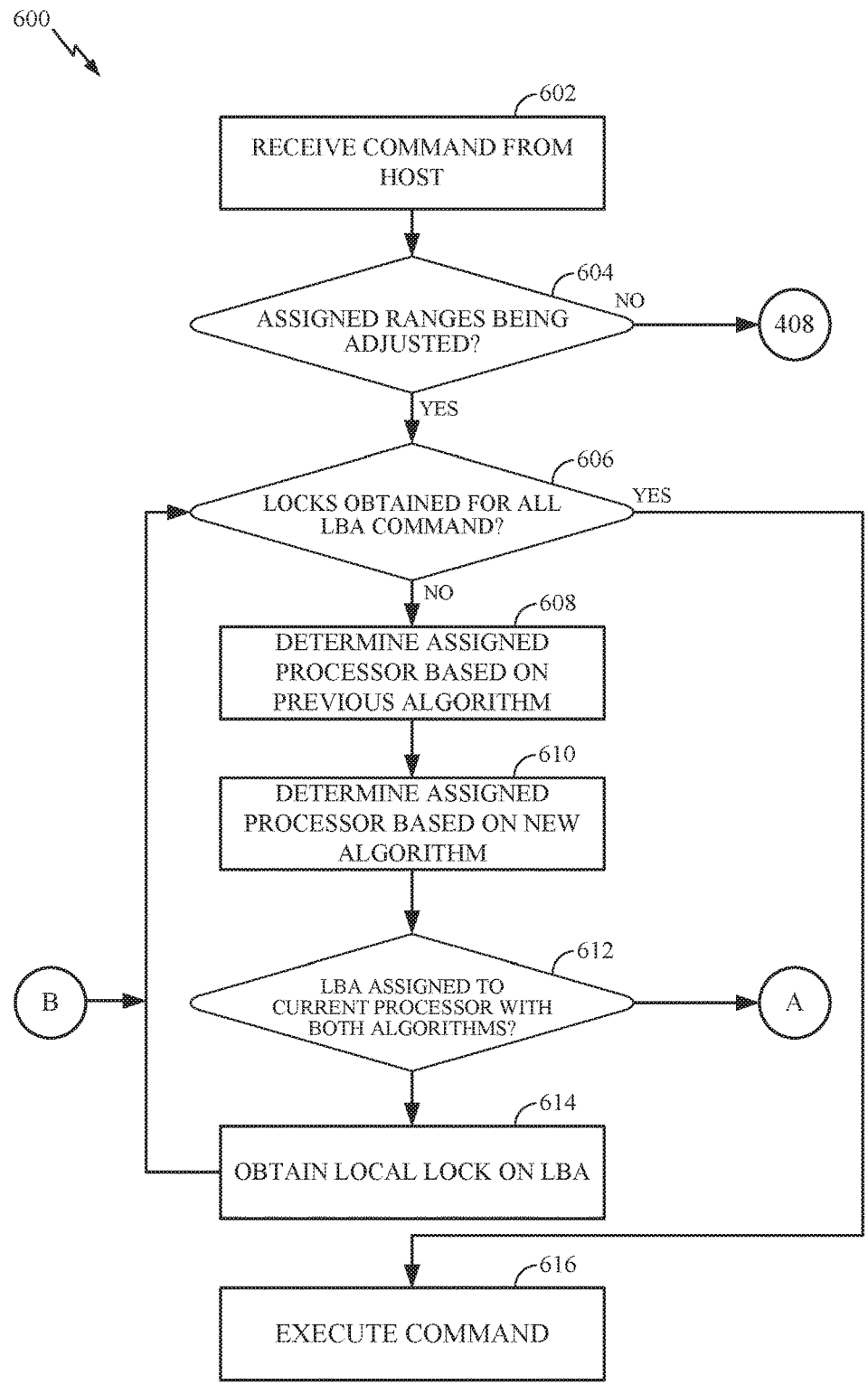
FIGS. 6A-6D are schematic flowcharts illustrating a technique for obtaining locks while adjusting processor range assignments, in accordance with aspects of the present disclosure.
Figure 6B:
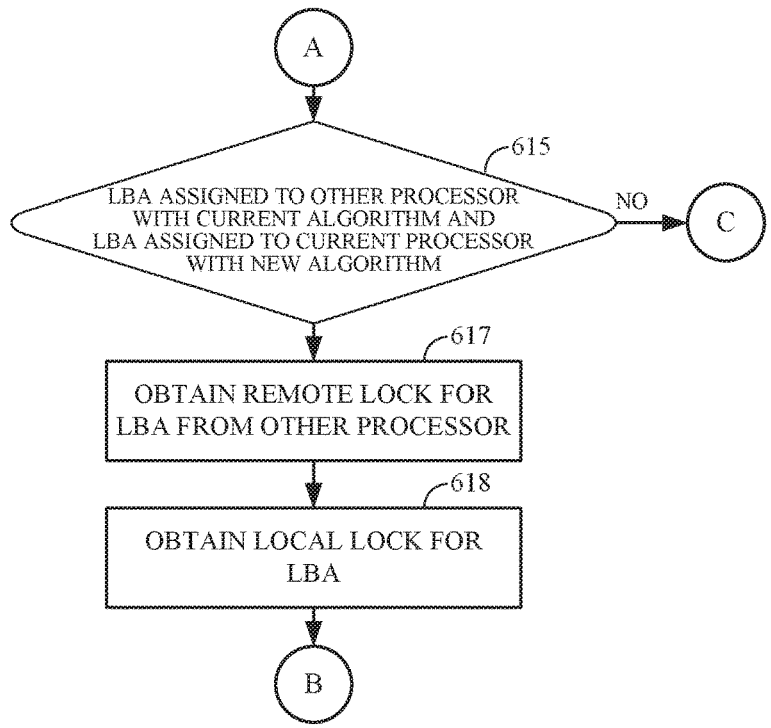

If, at operation 612, the LBA associated with the command is determined not to be assigned to the current processor in both the current and new algorithms, then execution proceeds to operation 615 of FIG. 6B. At operation 615, a determination is made whether the LBA is assigned to another processor under the current algorithm and the LBA is assigned to the current processor under the new algorithm. If so, at operation 617, a remote lock is obtained on the LBA from the other processor in a manner similar to that described in operation 418. At operation 618, a local lock on the LBA is obtained in a manner similar to that described in operation 412. Execution then loops back to operation 606.

Figure 6C:
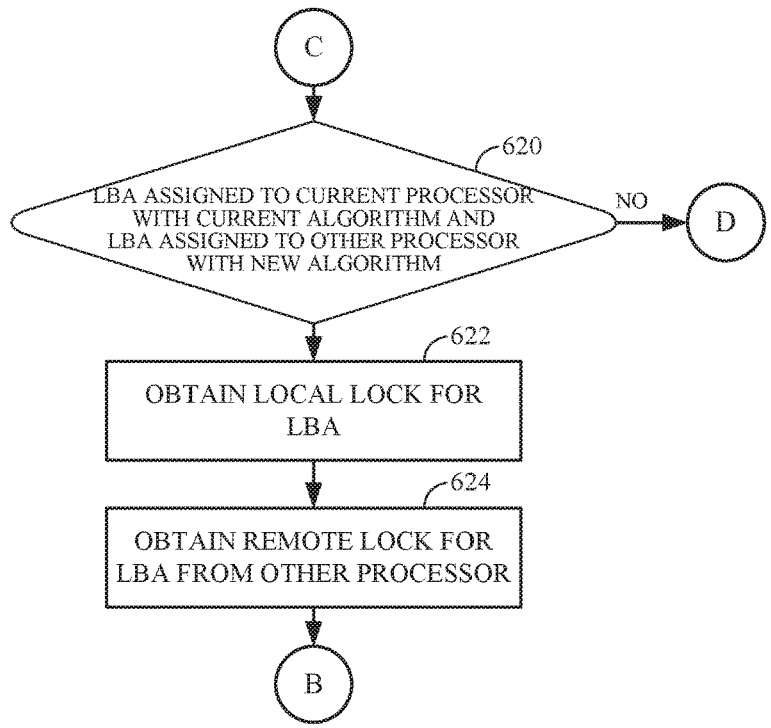

If, at operation 615, the LBA is determined not to be assigned to another processor under the current algorithm or the LBA is assigned to current different processor under the new algorithm, then execution proceeds to operation 620 of FIG. 6C. At operation 620, a determination is made whether the LBA is assigned to the current processor under the current algorithm and the LBA is assigned to another processor under the new algorithm. If so, at operation 622, a local lock on the LBA is obtained in a manner similar to that described in operation 412. At operation 624, a remote lock is obtained on the LBA from the other processor in a manner similar to that described in operation 418. Execution then loops back to operation 606.

Figure 6D:
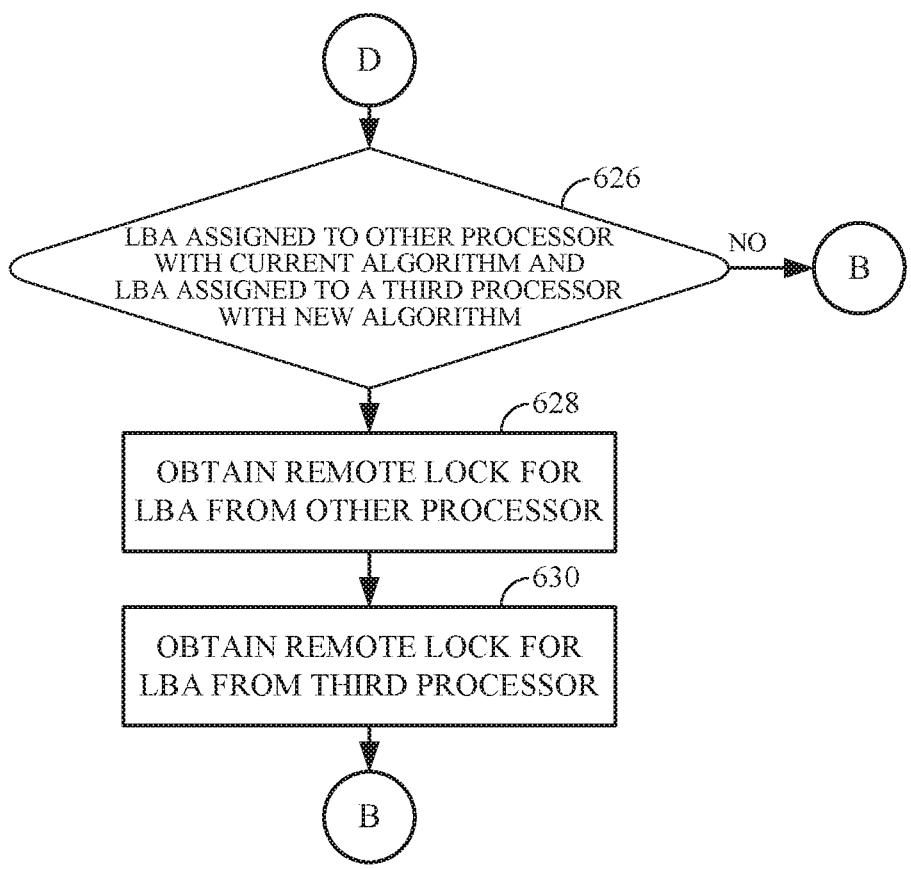

If, at operation 620, the LBA is determined not to be assigned to the current processor under the current algorithm or the LBA is assigned to the current processor under the new algorithm, then execution proceeds to operation 626 of FIG. 6D. At operation 626, a determination is made whether the LBA is assigned to another processor under the current algorithm and the LBA is assigned to a third processor under the new algorithm. If so, at operation 628, a remote lock is obtained on the LBA from the other processor in a manner similar to that described in operation 418. At operation 630, a remote lock is obtained on the LBA from the third processor is obtained in a manner similar to that described in operation 418. Execution then loops back to operation 606. If, at operation 626, the LBA is determined not to be assigned to another processor under the current algorithm and the LBA is assigned to a third processor under the new algorithm, an error may be returned and execution loops back to operation 606.

Figure 7:
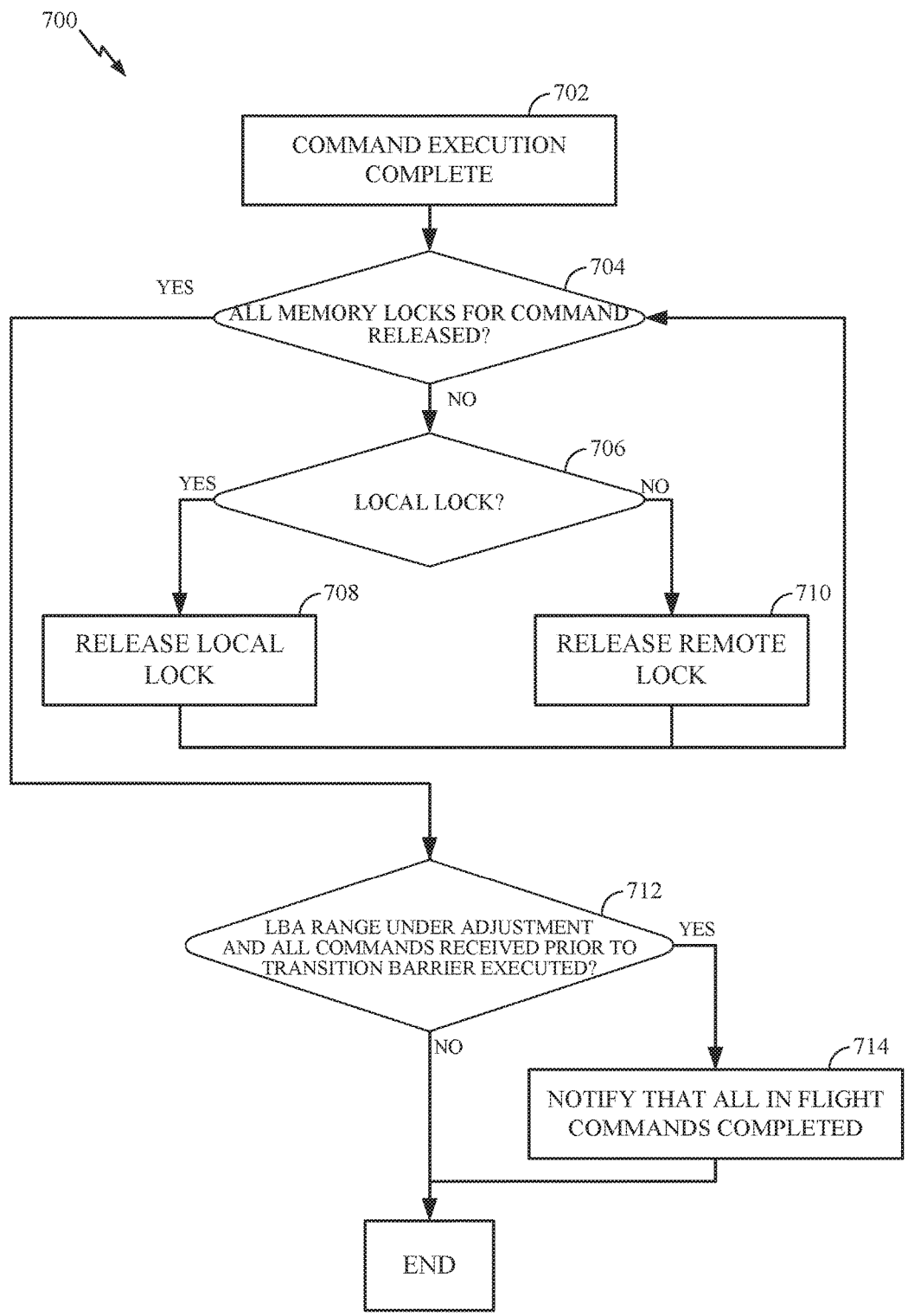
FIG. 7 is a schematic flowchart illustrating a technique for releasing memory locks, in accordance with aspects of the present disclosure.

FIG. 7 is a schematic flowchart 700 illustrating a technique for releasing memory locks, in accordance with aspects of the present disclosure. As discussed above, portions of memory, such as those referenced by a LBA may be locked by processor while executing a command on those portions of memory. After execution of the command completes at operation 702, the locks may be released. At operation 704, if not all memory locks have been released, at operation 706, the locks are checked to determine whether the locks are local or remote locks. At operation 708, local locks are released. At operation 710, remote locks may be released by sending an indication to release the lock to the processor holding the lock. After the locks are released, execution returns to operation 704 to determine whether all of the memory locks associated with the command have been released. In cases where locks were obtained while processor range assignments were being adjusted and locks obtained under both the (then) current and new algorithms, both sets of locks may be released. After all locks associated with the command have been released, a check, at operation 712, is performed to determine whether the processor range assignments are currently being adjusted and whether all commands received by the processor prior to receiving the transition barrier have been executed. This check prevents multiple processor range adjustment operations from taking place at the same time. If both conditions are true, then, at operation 714, the processor may send, for example to the distribution entity, an indication that the processor has finished executing all commands in flight before the transition barrier command was received.

Figure 8A:
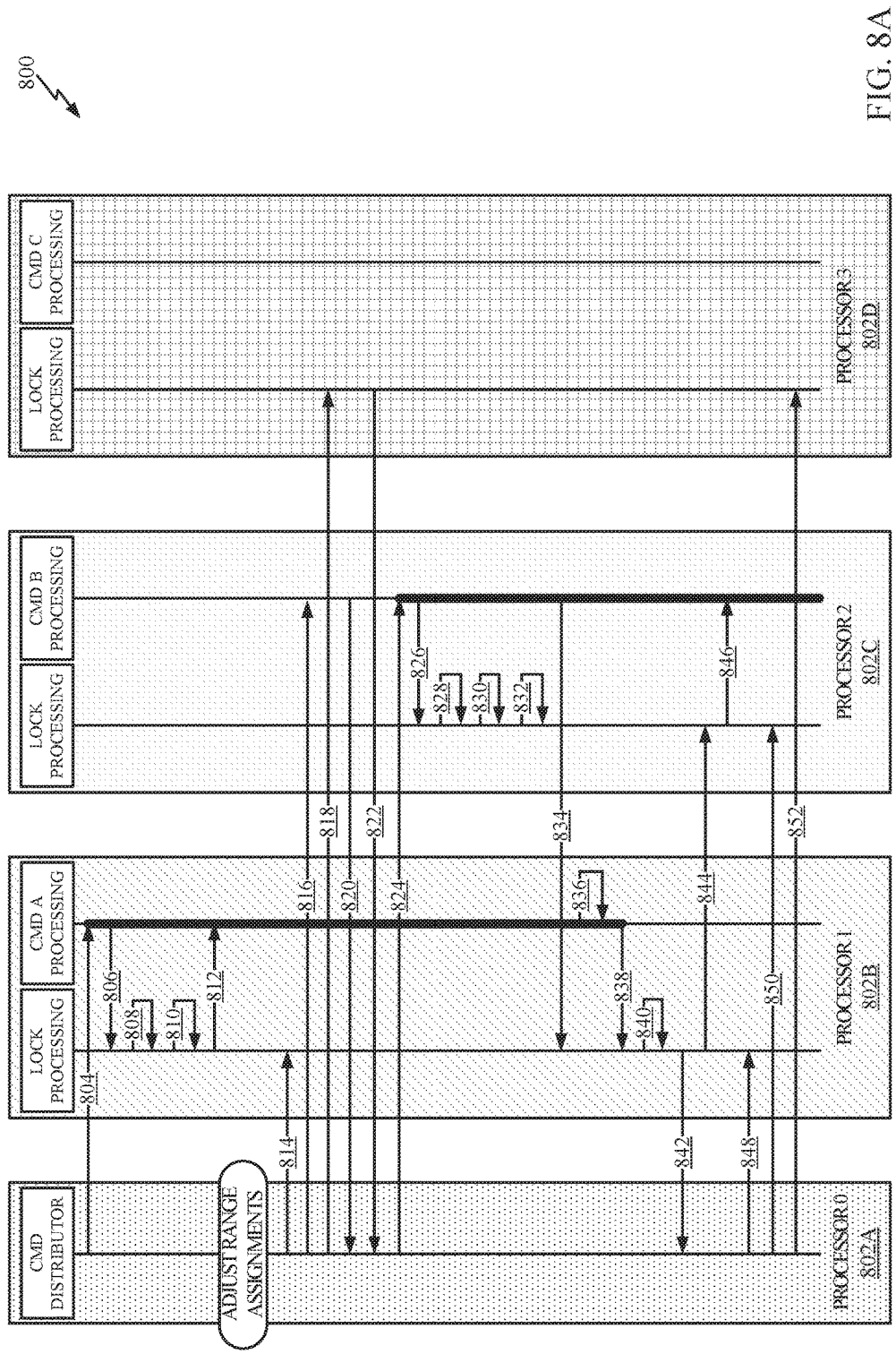
FIGS. 8A-8C is a call flow diagram 800 illustrating example processor range adjustment operations, in accordance with aspects of the present disclosure.
Figure 8B:
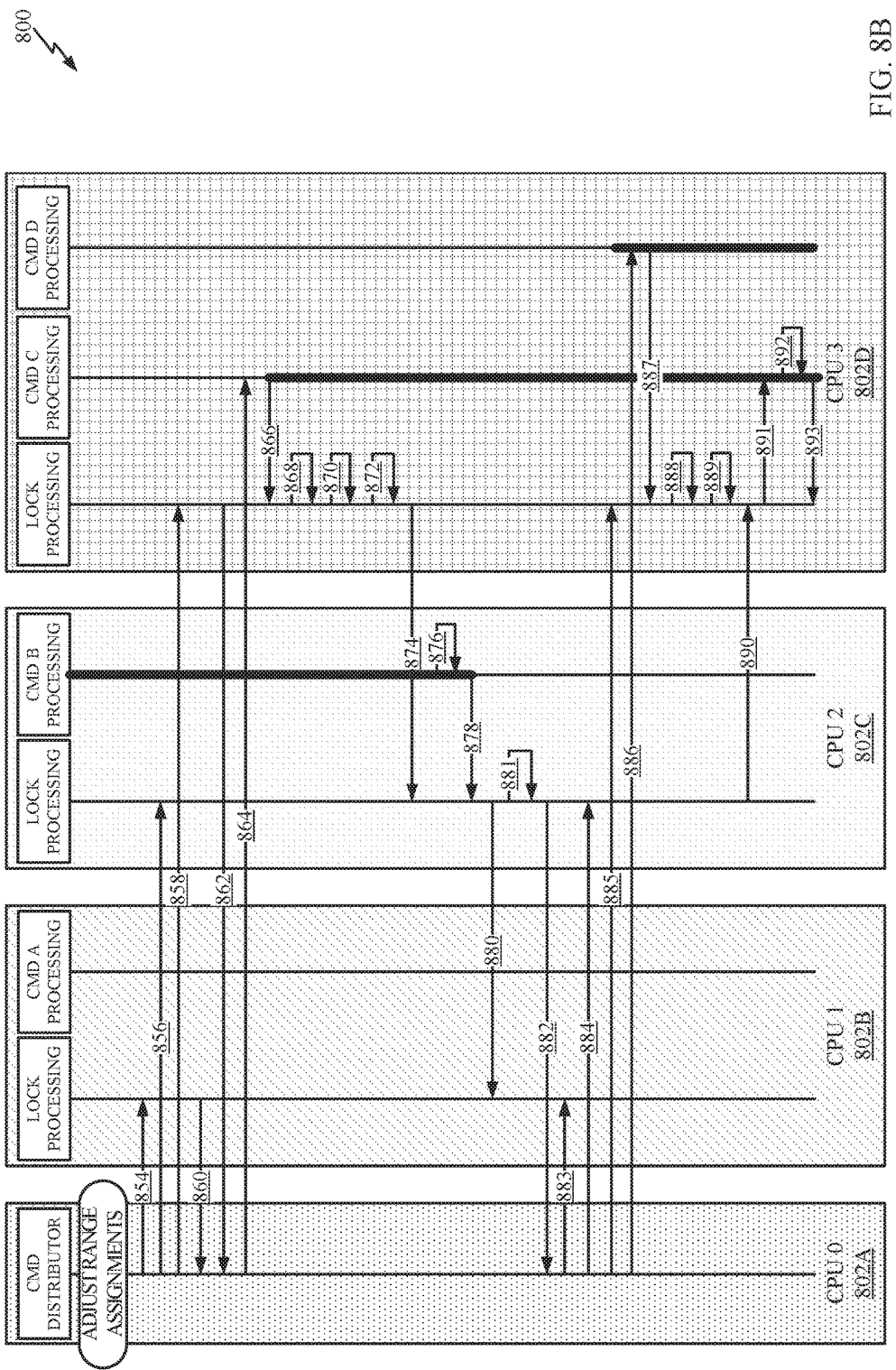
Figure 8C:
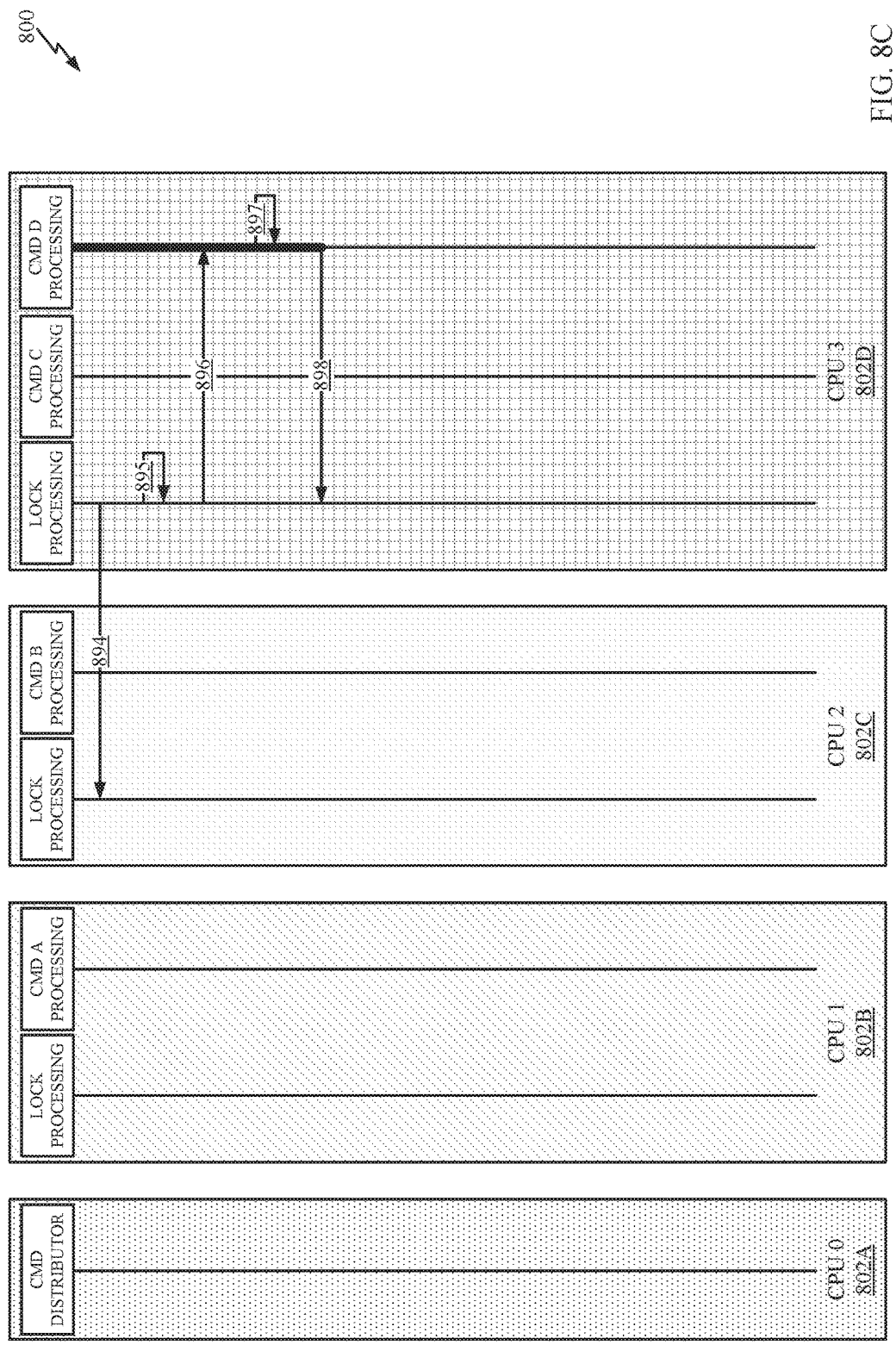

FIGS. 8A-8C is a call flow diagram 800 illustrating example processor range adjustment operations, in accordance with aspects of the present disclosure. The call flow diagram 800 illustrates call flows as between four processors 802A-802D, where processor 802A functions as the distribution entity and the other three processors 802B-802D processing commands. In the initial state, LBA 0x1000 is assigned to processor 802B. After a command accessing LBA 0x1000 is received from the host, processor 802A, at flow 804, may send a first command (CMD A) to processor 802B for processing (CMD A PROCESSING) as LBA 0x1000 is assigned to processor 802B. Processor 802B in processing the command requests a local memory lock for LBA 0x1000 at flow 806. At flow 808, a determination is made that there is not an ongoing processor range adjustment operation. At flow 810, a determination is made, based on a current processor range assignment algorithm that the LBA is assigned to the processor 802B and at flow 812, the local lock request is granted.

At some point after the command is sent to processor 802B, a determination, such as described in operation 502, is made that the workload is unbalanced and that range assignments should be adjusted. At flows 814, 816, and 818, transition barrier commands are sent to processors 802B, 802C, and 802D respectively. This transition barrier command may include a new range division algorithm for determining which LBAs are assigned to which processor. Under the new algorithm, LBA 0x1000 is to be assigned to processor 802C. At flows 820 and 822, processors 802C and 802D, respectively, respond indicating that processing of all commands received prior to receiving the transition barrier command have been completed.

At flow 824, a second command (CMD B) accessing LBA 0x1000 is sent to processor 802C for processing (CMD B PROCESSING). At flow 826, a memory lock for LBA 0x1000 is requested. At flow 828, a determination is made that there is an ongoing processor range adjustment operation. At flow 830, a determination is made, based on the current processor range assignment algorithm that the LBA is assigned to processor 802B. At flow 832, a determination is made, based on a new, second processor range assignment algorithm that the LBA is assigned to processor 802C. At flow 834, processor 802C issues a request for a remote lock for the LBA associated with CMD B to processor 802B. At flow 836, processor 802B executes the first command (CMD A). At flow 838, issues a request to releases its lock on the LBA associated with CMD A, and at flow 840, the local lock is released. Processor 802B, at flow 842, indicates to processor 802A that processing of all commands received prior to receiving the transition barrier command have been completed. At flow 844, processor 802B grants the request from processor 802C for a remote lock for the LBA associated with CMD B. At flow 846, processor 802C grants a local lock for the LBA associated with CMD B.

After receiving responses from processors 802B-802D have been received indicating that processing has been completed on all commands received prior to receiving the transition barrier command, the processor range adjustment operation is completed. At flows 848, 850, and 852, processor 802A transmits transition barrier complete commands to processors 802B, 802C, and 802D, respectively.

A determination may be made that another range assignments adjustment should be made, and at flows 854, 856, and 858, transition barrier commands are sent to processors 802B, 802C, and 802D respectively. This transition barrier command may include a third range division algorithm for determining which LBAs are assigned to which processor. Under the third algorithm, LBA 0x1000 is to be assigned to processor 802D. At flows 860 and 862, processors 802B and 802D, respectively, respond indicating that processing of all commands received prior to receiving the transition barrier command have been completed.

At flow 864, a third command (CMD C) accessing LBA 0x1000 is sent to processor 802D for processing (CMD C PROCESSING). At flow 866, a memory lock for LBA 0x1000 is requested. At flow 868, a determination is made that there is an ongoing processor range adjustment operation. At flow 870, a determination is made, based on the second processor range assignment algorithm that the LBA is assigned to processor 802C. At flow 872, a determination is made, based on a new, third processor range assignment algorithm that the LBA is assigned to processor 802D. At flow 874, processor 802D issues a request for a remote lock for the LBA associated with CMD C to processor 802C. At flow 876, processor 802C executes the second command (CMD B). At flow 878, a request to release the remote lock for the LBA associated with CMD B is issued. Processor 802C, at flow 880, issues a remote lock release command for the LBA associated with CMD B to processor 802B, and at flow 881, releases the local lock for the LBA. At flow 882, processor 802C responds indicating that processing has been completed on all commands received prior to receiving the transition barrier command and the processor range adjustment operation is completed. At flows 883, 884, and 885, processor 802A transmits transition barrier complete commands to processors 802B, 802C, and 802D, respectively.

At flow 886, a fourth command (CMD D) accessing LBA 0x1000 is sent to processor 802D for processing (CMD D PROCESSING). At flow 887, a memory lock for LBA 0x1000 is requested. At flow 888, a determination is made that there is not an ongoing processor range adjustment operation. At flow 889, a determination is made, based on the third processor range assignment algorithm that the LBA is assigned to processor 802D. At flow 890, processor 802D receives a remote lock response from processor 802C granting a remote lock with respect to CMD C. At flow 891, a local lock is issued for LBA 0x1000 associated with CMD C and at flow 892, processor 802C executes the third command (CMD C). At flow 893, a request to release the remote lock for the LBA associated with CMD C is issued. Processor 802D, at flow 894, issues a remote lock release command for the LBA associated with CMD C to processor 802C, and at flow 895, releases the local lock for the LBA.

Once the local lock for the LBA is released, execution on the fourth command, CMD D, which accesses the same LBA as the third command, CMD C, may proceed. At flow 896, the local lock request associated with CMD D is granted. At flow 897, processor 802D executes the fourth command (CMD D), and at flow 898, the local lock is released.

It is to be understood that the embodiments discussed herein are not limited to affecting the entire range of all possible LBAs. The embodiments disclosed herein are applicable to subsets of the entire range of all possible LBAs as well. Algorithms designed to be applied to subsets of the entire range may also be used. Adjusting the range for subsets of the entire range may help reduce disruptions during an adjustment operation.

According to aspects of the present disclosure, where a particular LBA range spans more than a single atomic unit, then the command is broken down at the atomic unit boundaries. Once locks within an atomic unit are obtained, then the command may be executed on that atomic unit. Similarly, once the command completes on those LBAs, the locks may be released.

It should be appreciated that while examples provided herein processing on a single command with one or more LBAs, one skilled in the art would be capable of applying the contents of this disclosure to batch processing of commands based on other boundaries, such as an atomic unit, or to select LBAs within a command to selectively obtain locks on certain LBAs while performing operations on other LBAs in parallel.

While the foregoing is directed to embodiments of the present disclosure, other and further embodiments of the disclosure may be devised without departing from the basic scope thereof, and the scope thereof is determined by the claims that follow.

What is claimed is:

1. A method for accessing a storage device, comprising:
   receiving, from a host apparatus, an access request directed at two or more storage addresses;
   assigning, based on a first storage address of the two or more storage addresses, the access request to a first processor of two or more processors of the storage device;
   obtaining a local memory lock based on the first storage address;
   determining, based on a second storage address of the two or more storage addresses, that the second storage address is assigned to a second processor of the two or more processors;
   obtaining a remote memory lock from the second processor based on the second storage address;
   issuing a transition barrier command to each processor of the two or more processors;
   receiving, from each processor of the two or more processors, a response to the transition barrier command;
   issuing a transition barrier complete message to each processor of the two or more processors after receiving the response from all of the two or more processors; and
   processing the access request.

2. The method of claim 1, further comprising:
   determining to change from a first algorithm for assigning storage addresses to the two or more processors to a second algorithm.

3. The method of claim 2, wherein the transition barrier command includes the second algorithm.

4. The method of claim 2, further comprising:
   determining, for a third storage address, a first assigned processor based on the first algorithm and a second assigned processor based on the second algorithm; and
   obtaining memory locks based on both the first and second assigned processors.

5. The method of claim 4, wherein obtaining memory locks comprises:
   determining the first or second assigned processor is different from a current processor; and
   obtaining a remote memory lock from the first or second assigned processor based on the determination.

6. The method of claim 4, wherein obtaining memory locks comprises:
   determining the first or second assigned processor is the same as a current processor; and
   obtaining a local memory lock based on the determination.

7. The method of claim 2, wherein the response indicating each processor has finished processing access requests is sent by each processor after each processor has finished processing access requests received prior to the transition barrier command.

8. A computer system for storing and retrieving data, comprising:
   a processor; and
   a memory storing instructions that, when executed by the processor, cause the computer system to:
      receive, from a host apparatus, an access request directed at two or more storage addresses;
      assign, based on a first storage address of the two or more storage addresses, the access request to a first processor of two or more processors of the storage device;
      obtain a local memory lock based on the first storage address;
      determine, based on a second storage address of the two or more storage addresses, that the second storage address is assigned to a second processor of the two or more processors;
      obtain a remote memory lock from the second processor based on the second storage address;
      issue a transition barrier command to each processor of the two or more processors;
      receive, from each processor of the two or more processors, a response to the transition barrier command;
      issue a transition barrier complete message to each processor of the two or more processors after receiving the response from all of the two or more processors; and
      process the access request.

9. The computer system of claim 8, wherein the instructions cause the computer system to:
   determine to change from a first algorithm for assigning storage addresses to the two or more processors to a second algorithm.

10. The computer system of claim 9, wherein the transition barrier command includes the second algorithm.

11. The computer system of claim 9, wherein the instructions cause the computer system to:
   determine, for a third storage address, a first assigned processor based on the first algorithm and a second assigned processor based on the second algorithm; and
   obtain memory locks based on both the first and second assigned processors.

12. The computer system of claim 11, wherein obtain memory locks comprises:
   determining the first or second assigned processor is different from a current processor; and
   obtaining a remote memory lock from the first or second assigned processor based on the determination.

13. The computer system of claim 11, wherein obtain memory locks comprises:
   determining the first or second assigned processor is the same as a current processor; and
   obtaining a local memory lock based on the determination.

14. The computer system of claim 9, wherein the response indicating each processor has finished processing access requests is sent by each processor after each processor has finished processing access requests received prior to the transition barrier command.

15. A non-transitory computer readable storage medium containing instructions that, when executed by a processor, performs the following method:
   receive, from a host apparatus, an access request directed at two or more storage addresses;
   assign, based on a first storage address of the two or more storage addresses, the access request to a first processor of two or more processors of the storage device;

obtain a local memory lock based on the first storage address;

determine, based on a second storage address of the two or more storage addresses, that the second storage address is assigned to a second processor of the two or more processors;

obtain a remote memory lock from the second processor based on the second storage address;

issue a transition barrier command to each processor of the two or more processors;

receive, from each processor of the two or more processors, a response to the transition barrier command;

issue a transition barrier complete message to each processor of the two or more processors after receiving the response from all of the two or more processors; and process the access request.

16. The non-transitory computer readable storage medium of claim 15, wherein the instructions cause the computer system to:

determine to change from a first algorithm for assigning storage addresses to the two or more processors to a second algorithm.

17. The non-transitory computer readable storage medium of claim 16, wherein the transition barrier command includes the second algorithm.

18. The non-transitory computer readable storage medium of claim 16, wherein the instructions cause the computer system to:

determine, for a third storage address, a first assigned processor based on the first algorithm and a second assigned processor based on the second algorithm; and obtain memory locks based on both the first and second assigned processors.

19. The non-transitory computer readable storage medium of claim 18, wherein obtain memory locks comprises:

determining the first or second assigned processor is different from a current processor; and obtaining a remote memory lock from the first or second assigned processor based on the determination.

20. The non-transitory computer readable storage medium of claim 18, wherein obtain memory locks comprises:

determining the first or second assigned processor is the same as a current processor; and obtaining a local memory lock based on the determination.

21. The non-transitory computer readable storage medium of claim 16, wherein the response indicating each processor has finished processing access requests is sent by each processor after each processor has finished processing access requests received prior to the transition barrier command.

22. A device, comprising:

means for receiving, from a host apparatus, an access request directed at two or more storage addresses;

means for assigning, based on a first storage address of the two or more storage addresses, the access request to a first processor of two or more processors of the storage device;

first means for obtaining a local memory lock based on the first storage address;

means for determining, based on a second storage address of the two or more storage addresses, that the second storage address is assigned to a second processor of the two or more processors;

second means for obtaining a remote memory lock from the second processor based on the second storage address;

means for issuing a transition barrier command to each processor of the two or more processors;

means for receiving, from each processor of the two or more processors, a response to the transition barrier command;

means for issuing a transition barrier complete message to each processor of the two or more processors after receiving the response from all of the two or more processors; and means for processing the access request.

23. The device of claim 22, wherein the first means for obtaining a local memory lock and the second means for obtaining a remote memory lock are the same means.

24. The device of claim 23, wherein the means for receiving, the means for assigning, the first means for obtaining a local memory lock, the means for determining and the second means for obtaining a remote memory lock are the same means.

25. The device of claim 22, wherein the means for processing comprises a plurality of means for processing.

26. The device of claim 25, further comprising means for indicating each means for processing has finished processing access requests.

* * * * *